Dec. 27, 1966 J. F. JAMES 3,295,009
FOCUS COMPENSATING CIRCUIT FOR TELEVISION CAMERA TUBES
Filed Jan. 29, 1962
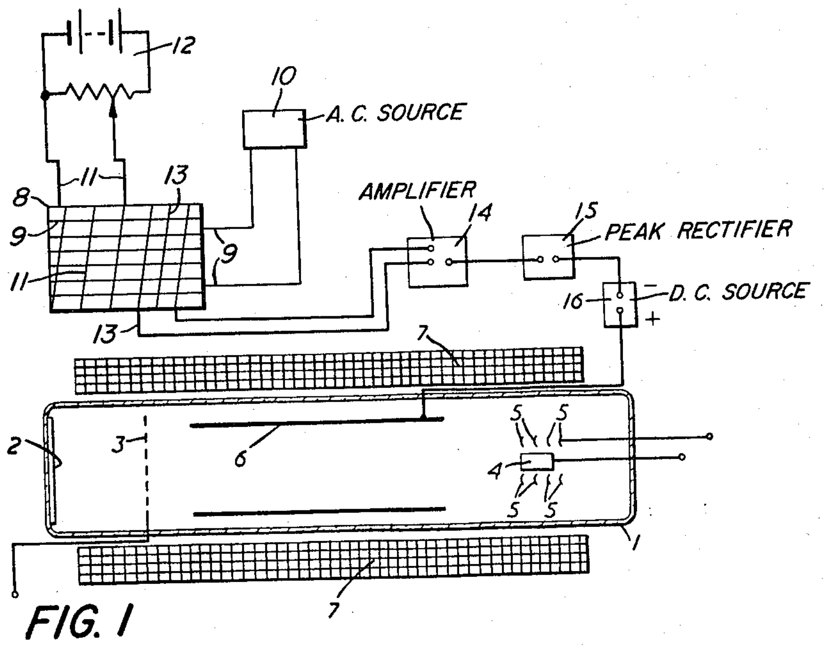
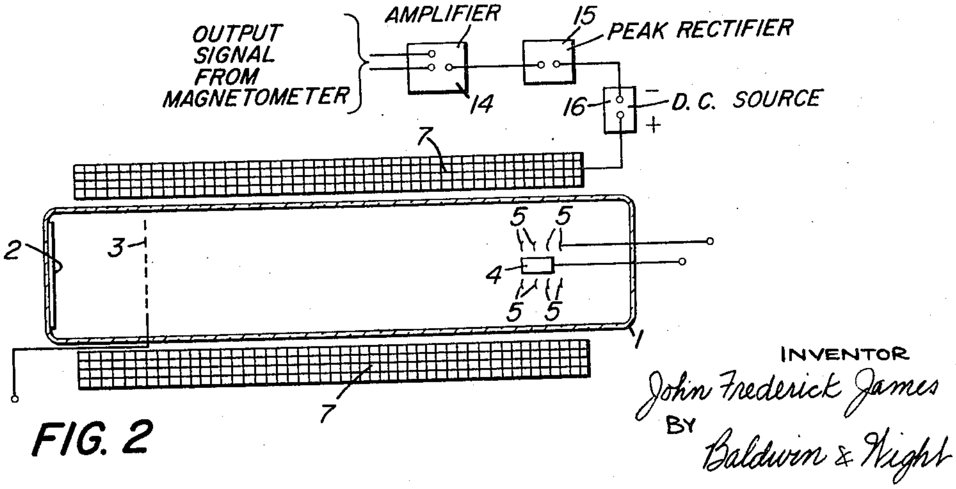
INVENTOR
John Frederick James
BY Baldwin & Wight
ATTORNEYS United States Patent Office 3,295,009
Patented Dec. 27, 1966

3,295,009
FOCUS COMPENSATING CIRCUIT FOR TELEVISION CAMERA TUBES

John Frederick James, Little Baddow, Essex, England, assignor to The Marconi Company Limited, a British company Filed Jan. 29, 1962, Ser. No. 169,191
Claims priority, application Great Britain, Feb. 3, 1961, 4,140/61
8 Claims. (Cl. 315—8)

This invention relates to a focus compensating circuit for television camera tube arrangements and more specifically to such arrangements of the kind in which the camera tube is of the type employing a scanning beam of low electron velocity e.g. an image orthicon tube.

As is well known, with the image orthicon type of television camera tube an optical image of the subject of transmission is focused upon a photo-electric cathode (usually deposited on one end wall of the tube) and a corresponding electric charge pattern produced on a target is scanned by a scanning electron beam from an electron gun to produce returning electrons which return to the first dynode of a secondary electron multiplier electrode system (usually arranged round the electron gun) from the final electrode of which an amplified picture signal output corresponding to the charge pattern and therefore to the image is taken. It is a practical operating requirement that the scanning electron beam shall be accurately focused upon the target and shall be incident orthogonally thereon, i.e. shall always strike it at right angles to its plane. To this end the usual image orthicon tube is provided with a focusing electrode or electrode system through which the scanning beam to the target passes and is also subjected to an axial focusing magnetic field of suitable value. This magnetic field is provided by means of a focusing coil or coil system which customarily forms part of a coil unit which also includes line and frame deflection coils for producing scanning action and sometimes also a so-called "orbiting" coil system by means of which the charge pattern may, when desired, be moved on the target.

Image orthicon and similar television camera tube arrangements as now in common use have one or more—often all—of the following defects. These are (1) a form of distortion known as "tree trunk" distortion in the pictures reproduced from the output, (2) other variations, not corresponding to the charge pattern on the target, in the output picture signals, and (3) variations in picture resolution, especially when the camera is moved about. "Tree trunk" distortion manifests itself as the appearance of shaded areas, more or less resembling tree trunks in appearance, near the picture edges. It is difficult to give a full and detailed explanation of the causes of these defects, but experiment appears to indicate that defects (1) and (2) arise from the fact that owing to the position of the electron multiplier in the usual image orthicon type of tube, the returning electron beam is to some extent focused on the first dynode of the multiplier and is sufficiently affected by the line and frame scanning fields to have scanning movement over the dynode. Experiment also indicates that the third defect—variation in resolution—is due to extraneous stray axial field components—notably the axial component of the earth's magnetic field—to which the tube, which in practice is at least partly unscreened, is subjected, these stray axial field components varying appreciably when the tube is moved above. It is possible, for a given position of the tube, greatly to reduce or even practically to eliminate the first two defects by careful attention to the geometry and design of the tube electrodes and the distribution and strength of the axial focusing magnetic field, but movement of the tube is apt to upset the results and cause the said defects to return in other positions of the tube since variations in the stray axial field components of course produce focusing variations. Moreover, the third defect still remains. While it might appear that these difficulties could be overcome by magnetically screening the tube from extraneous stray fields it is not practicable to do this. Enclosing the tube in a magnetic screen presents serious practical disadvantages from the point of view of space, weight and cost and in any event the fact that the "window" end of the tube must be open to light prevents complete screening. Also experiment with screening indicates that it is apt in itself to produce some degradation of resolution, probably by causing undesirable coupling between the image and scanning sections of the tube.

According to this invention in its broadest aspect a television camera tube arrangement including a camera tube of the type referred to comprises means responsive to the axial component of any extraneous magnetic field to which the tube may be subjected for automatically varying the adjustment of focusing means provided for said tube so as substantially to compensate for undesired variations of focusing that would otherwise be produced by said extraneous field.

Automatic variation of the adjustment of the focusing means may be effected by varying the current through at least part of the normally provided focusing coil of the tube. It is preferred, however, to effect such variation by varying the voltage applied to a normally provided tube electrode the potential on which affects focusing. It is, of course, possible to use both these expedients simultaneously, but simple voltage control of an electrode is preferred.

Preferably the means responsive to the axial component of extraneous magnetic field is a so-called magnetometer so mounted that its position in relation to the tube remains the same when the tube is moved. Such a magnetometer may comprise, in known manner, a core carrying an energising winding to which is applied an input frequency (normally of the order of several kc./s.) an output winding at right angles to the energising winding, and means for magnetically biasing the core, the whole arrangement being such that the core is brought to saturation on the amplitude peaks of the input frequency so that there is available from the output winding an output which is a measure of any extraneous field to which the core is subjected and is of twice the input frequency. With such an arrangement the magnitude of the output is proportional to the magnitude of the extraneous field but independent of its sign. In carrying out the present invention it is required to obtain an output which varies continuously as the field varies from a maximum in one direction to a maximum in the opposite direction. This may be achieved by applying a constant biasing field to the magnetometer core. The biasing of the core may be obtained by means of a third coil provided on the core and also at right angles to the output coil, said third coil being energised either by passing through it a current (preferably adjustable) from a suitable independent source or by connecting it in parallel or in series with the tube focusing coil, or part thereof. The latter arrangement has the advantage of providing a measure of automatic compensation for undesired variations of focusing coil current. Biasing of the core may also be obtained by means of a permanent magnet or by mounting the core in such relation to the tube as to be in the stray field of the focusing so that said stray field provides the biasing—an arrangement which also provides a measure of automatic compensation for undesired variations of focusing coil current. In any event the output from the output coil of the magnetometer is preferably amplified by an amplifier tuned to twice the magnetometer input frequency, detected by a peak detector, and the detected resultant superimposed upon a suitable additional potential and applied to a focusing electrode of the tube.

The invention is illustrated in the accompanying drawings, in which FIGURE 1 represents in diagrammatic form a preferred embodiment of the invention, and FIGURE 2 represents in diagrammatic form a modification of the embodiment shown in FIGURE 1.

Referring to FIGURE 1, 1 is the envelope of an image orthicon tube on one end wall of which is a photocathode represented by the line thickening 2; 3 is the usual target of the tube; 4 represents the electron gun thereof; and 5 is a secondary electron multiplier dynode system represented as arranged around the gun as in normal practice. A focusing electrode system represented by a single tubular electrode 6 is between the gun and the target. Around the tube envelope is a coil system 7 represented as a single coil but including the focusing coil, scanning coils and any other normally provided additional coils—e.g. a so-called orbiting coil—which may be required. Mounted near the tube and in fixed relation thereto is a magnetometer the core 8 of which is shown as a hollow cylindrical core with its axis parallel to the tube axis. On this core is wound longitudinally an input winding 9 which is energised by an input frequency $f$ normally of the order of kc./s., e.g. 10 kc./s. The input frequency is obtained from a source 10 and may be adjustable in amplitude. The core 8 is magnetically biased by an axial magnetic field which may be provided in any of the ways hereinbefore described and for simplicity is shown as provided by a second coil 11 wound at right angles to the coil 9 and energised from a suitable potential source represented by the battery and potentiometer combination 12. An output coil 13 wound over the core in the same way as the coil 11 provides an output voltage containing even harmonies of the input frequency (the second harmonic will normally be employed) and which is arranged as known per se to be a measure of an extraneous or stray magnetic field component which is axial with respect to the core.

The output from the coil 13 is amplified by an amplifier 14 tuned to $2f$. The amplified output from amplifier 14 is rectified by a peak rectifier 15 and superimposed upon a suitable D.C. potential (which may be adjustable) from a source 16 for application to the focusing electrode system 6.

The whole arrangement is designed and adjusted to provide best operating conditions for the camera tube and minimum distortions and extraneous signals when the tube is in operation in a given predetermined position. The adjustments of the magnetometer and associated units 10, 12, 14, 15 and 16 are such that if the tube is now moved from this predetermined position (and, of course, the magnetometer moves with it) or if for any other reason the extraneous stray magnetic field axial components affecting the tube and the magnetometer vary, the resultant variation of the voltage on the electrode system 6 will be such as substantially to compensate for the undesired effects of such variations as already explained.

In this particular embodiment of the invention, the normal focusing of the electron beam is accomplished magnetically by the coil system 7, the focusing coil portion of which generates a longitudinal magnetic focusing field which compresses the electron beam and overcomes the repelling force between electrons in the beam. In the absence of a longitudinal magnetic focusing field, the electrons in the beam repel one another and thus cause the beam to diverge. In the presence of a strong longitudinal magnetic field such as is provided by coil system 7, the diverging electrons of the beam cross magnetic lines of flux and the resulting force is such as to overcome the forces of repulsion and hence confine the electrons to a beam of small area. When the tube is physically moved, however, the strength of the focusing field is changed due to variation in the axial component of extraneous magnetic fields, and in the absence of means for compensating for this variation, the focus would be varied which would produce undesired variations in picture resolution. In this embodiment of the invention, this undesired variation is prevented by applying a compensating potential to the electrode system 6 which, by means of electrostatic attraction or repulsion, is capable of varying the focus of the beam independently of the longitudinal magnetic field. The variations of potential applied to electrode system 6 are arranged to produce an opposite effect from the variation in the extraneous magnetic fields detected by the magnetometer. For example, if the camera tube is moved in such a direction that the variation of the extraneous magnetic field tends to weaken the magnetic focusing field, the potential variation applied to electrode system 6 will tend to strengthen the electrostatic focusing field to compensate for the weakening of the magnetic field, thereby keeping the focus constant under variations in the ambient axial magnetic field.

FIGURE 2 shows a modification of the embodiment of FIGURE 1 in which the compensation is accomplished by varying the current through the focusing coil portions of coil system 7 rather than by varying an electrostatic field as shown in FIGURE 1. This embodiment of the invention does not require a focusing electrode system 6 such as is in the embodiment of FIGURE 1.

I claim:

1. In a television camera tube including means for producing an electron beam and means for focusing said electron beam, the improvement comprising magnetometer means mounted in fixed spatial relationship to said camera tube, said magnetometer means being responsive to the axial component of extraneous magnetic fields and being operable to produce an output signal proportional to the axial component of said extraneous magnetic fields, and means coupled between said magnetometer means and said focusing means for automatically varying the adjustment of said focusing means in response to variations in the output signal of said magnetometer means to compensate for undesired variations of focusing that would otherwise be produced by variations in said extraneous magnetic field.

2. The combination defined in claim 1 wherein said focusing means comprises a focusing coil for magnetically focusing said electron beam, said magnetometer means being mounted with its axis parallel to the axis of said camera tube, and said means coupled between said magnetometer means and said focusing means comprising means for automatically varying the current flow through at least a part of said focusing coil in response to variations in the output signal of said magnetometer means to compensate for undesired variations of focusing that would otherwise be produced by variations in said extraneous magnetic fields.

3. The combination defined in claim 1 wherein said focusing means comprises a focusing coil for magnetically focusing said electron beam, and electrostatic means for varying the focus produced by said focusing coil, said magnetometer means being mounted with its axis parallel to the axis of said camera tube, and said means coupled between said magnetometer means and said focusing means comprising means for automatically varying the potential of said electrostatic means in response to variations in the output signal of said magnetometer means to compensate for undesired variations of focusing that would otherwise be produced by variations in said extraneous magnetic fields.

4. The combination defined in claim 3 wherein said means coupled between said magnetometer means and said focusing means comprises an amplifier coupled to the output of said magnetometer, a peak rectifier coupled to the output of said amplifier, and a D.C. source coupled between the output of said peak rectifier and said electrostatic means, wherein the output from the magnetometer is amplified by said amplifier, rectified by said peak rectifier, and the rectified resultant superimposed upon a D.C. potential and applied to said electrostatic means.

5. An arrangement as claimed in claim 2 wherein the magnetometer comprises a core carrying an energizing winding, means for applying an alternating current signal to said energizing winding, an output winding at right angles to the energizing winding, and means for magnetically biasing the core, the whole arrangement being such that the core is brought to saturation on the amplitude peaks of the alternating current signal, the current in the output winding varying continuously as the field varies from a maximum in one direction to a maximum in the opposite direction.

6. An arrangement as claimed in claim 5 wherein the means for biasing the core includes a third coil on the at right angles to the output coil and source means coupled to said third coil.

7. An arrangement as claimed in claim 5 wherein the means for biasing the core includes a third coil on the core at right angles to the output coil and means for energizing said third coil.

8. An arrangement as claimed in claim 5 wherein the means for biasing the core includes said focusing means, said core being in the stray field of the focusing means whereby said stray field provides the biasing.

References Cited by the Examiner

UNITED STATES PATENTS

| | | | |
|---|---|---|---|
| 2,214,729 | 9/1940 | Hickok | 315—8 X |
| 2,433,682 | 12/1947 | Bradley | 313—84 |
| 2,921,226 | 1/1960 | Vasilevskis | 315—8 |

HERMAN KARL SAALBACH, *Primary Examiner.*

RALPH NILSON, *Examiner.*

E. LIEBERMAN, S. CHATMON, Jr.,
*Assistant Examiners.*